United States Patent [19]

Harada

[11] Patent Number: 4,672,498

[45] Date of Patent: Jun. 9, 1987

[54] TAPE CASSETTE HAVING REELS WITH LIMITED AXIAL TRAVEL

[75] Inventor: Masayuki Harada, Tokyo, Japan

[73] Assignee: Sony Corporation, Tokyo, Japan

[21] Appl. No.: 687,292

[22] Filed: Dec. 28, 1984

[30] Foreign Application Priority Data

Dec. 29, 1983 [JP] Japan ............................ 58-202856[U]

[51] Int. Cl.⁴ ............................................. G11B 23/08
[52] U.S. Cl. ..................................... 360/132; 242/198
[58] Field of Search ......................... 360/132; 242/198

[56] References Cited

U.S. PATENT DOCUMENTS

| | | | |
|---|---|---|---|
| 3,900,171 | 8/1975 | Serizawa | 360/132 |
| 3,900,172 | 8/1975 | Kamaya | 242/198 |
| 4,545,550 | 10/1985 | Wolf et al. | 360/132 |

FOREIGN PATENT DOCUMENTS

| | | |
|---|---|---|
| 2735992 | 8/1977 | Fed. Rep. of Germany . |
| 2909502 | 10/1979 | Fed. Rep. of Germany . |
| 3010405 | 10/1980 | Fed. Rep. of Germany . |
| 2016415 | 9/1979 | United Kingdom . |

Primary Examiner—Robert S. Tupper
Attorney, Agent, or Firm—Lewis H. Eslinger; Alvin Sinderbrand

[57] ABSTRACT

A tape cassette comprises a cassette housing including an upper section and a lower section. The upper section has a top wall including an opaque portion and a transparent window plate, and the lower section has a bottom wall formed with a pair of hub-receiving apertures therein. The top and bottom walls lie substantially in parallel spaced-apart planes. A pair of tape reels are mounted within the housing, each of the tape reels being formed with a hub and having an axis extending in a direction substantially normal to the planes of the top and bottom walls. The hubs are respectively rotatably received within the hub-receiving apertures. A rib is formed on the top wall and projects therefrom towards the tape reels. Each of the tape reels is movable axially between a lower position limited by engagement with the bottom wall and an upper position limited by engagement with the rib. The rib is spaced apart from the bottom wall a distance sufficient to enable axial movement of each of the tape reels away from the bottom wall in order to facilitate rotation of the tape reels but insufficient to enable withdrawal of the hubs from the respective hub-receiving apertures. The upper section of the cassette is formed by a method employing a mold having stationary and movable cores.

9 Claims, 13 Drawing Figures

TAPE CASSETTE HAVING REELS WITH LIMITED AXIAL TRAVEL

BACKGROUND OF THE INVENTION

1. Field of the Invention

This invention relates to tape cassettes and, more particularly, to a novel and highly-effective tape cassette comprising a pair of tape reels mounted therein in such a manner that they can be moved in an axial direction away from the bottom wall of the cassette through a distance sufficient to enable rotation of the tape reels but insufficient to enable withdrawal of the tape reel hubs from hub-receiving apertures which are formed in the bottom wall and within which the tape reel hubs are received. The invention relates also to a novel and highly-effective method of manufacturing a section of the cassette housing that includes a transparent window plate.

2. Description of the Prior Art

A conventional tape cassette of the sort used for a video tape recorder includes a pair of tape reels mounted rotatably in a cassette housing. A magnetic tape is wound on the reels and transported from one reel to the other to facilitate recording, playback, fast-forward, rewind, etc. The upper section of the housing has a top wall including a transparent window plate, the inside of the cassette housing being visible through the window plate so that the amounts of tape wound on each reel can be visually confirmed. Each reel has a hub, the hubs being rotatably fitted in respective hub-receiving apertures formed in the bottom wall of the cassette housing.

A spring affixed to the top wall of the housing engages the tape reels and urges them against the bottom wall of the housing but permits the tape reels to be moved in an axial direction away from the bottom wall to facilitate rotation of the tape reels.

When the tape cassette is handled, the exposed end of either reel hub may be accidently pushed by a thumb or finger and moved too far in an axial direction away from the bottom wall of the housing so that the hub comes out of the associated hub-receiving aperture and mounts the bottom wall on the inside thereof. If the tape cassette is inserted into a video tape recorder in this condition, the reel drive shaft of the tape recorder can not be inserted into the hub aperture, the cassette will not operate, and the tape reel may be damaged.

OBJECTS AND SUMMARY OF THE INVENTION

An object of the present invention is to provide a tape cassette wherein tape reels held in the cassette housing are restricted in the amount of their upward movements so that the reel hubs are prevented from coming out of hub-receiving apertures provided in a lower section of the cassette housing. In particular, an object of the invention is to ensure that the hubs of the tape reels are always maintained in the hub-receiving apertures so that the tape reels remain correctly positioned, even if intentionally or inadvertently pushed upwards and sideways with a substantial force.

Another object of the invention is to provide a tape cassette having an upper section (including a transparent window plate) that is reinforced to improve its mechanical strength.

Another object of the invention is to provide a tape cassette having an upper section including an opaque portion and a transparent window plate that are joined securely together so as not to become detached.

Still another object of the invention is to provide a method of simply, inexpensively, and substantially instantaneously manufacturing a section of a tape cassette housing having an upper section including a transparent window plate joined to an opaque portion.

In accordance with an aspect of the invention, the foregoing and other objects are attained in a tape cassette comprising: a cassette housing including an upper section and a lower section, the upper section having a top wall including an opaque portion and a transparent window plate and the lower section having a bottom wall formed with a pair of hub-receiving apertures therein, the top and bottom walls lying substantially in parallel, space-apart planes; a pair of tape reels mounted within the housing, each of the tape reels being formed with a hub and having an axis extending in a direction substantially normal to the planes of the top and bottom walls, the hubs being respectively rotatably received within the hub-receiving apertures; and rib means formed on the top wall and projecting therefrom towards the tape reels, each of the tape reels being movable axially between a lower position limited by engagement with the bottom wall and an upper position limited by engagement with the rib means, the rib means being spaced apart from the bottom wall a distance sufficient to enable axial movement of each of the tape reels away from the bottom wall in order to facilitate rotation of the tape reels but insufficient to enable withdrawal of the hubs from the respective hub-receiving apertures.

In accordance with an independent aspect of the invention, a method is provided for manufacturing a section of a tape cassette housing, the section being normally closely spaced apart from adjacent axial ends of a pair of tape reels which are mounted within the housing with their axes in parallel spaced-apart relation in such a manner that they are capable of rotational and axial movement; the method comprising the steps of: providing a mold having stationary core means and movable core means, the movable core means being movable between a retracted position such that the stationary core means and the movable core means cooperate to define a mold cavity having a shape corresponding to the desired shape of the section and an advanced position wherein the movable core means occupies a portion of the cavity; moving the movable core means to the advanced position; injecting an opaque plastic into the cavity while the movable core means is in the advanced position, whereby the opaque plastic flows around the movable core means to form an opaque portion of the section having a window aperture therein defined by the movable core means; moving the movable core means to the retracted position, whereby the window aperture is vacated; and injecting a transparent plastic into the vacated window aperture at an elevated temperature to form a transparent window plate therein having an interface with the opaque portion, the elevated temperature being such that the transparent plastic and the opaque plastic are fused together along the interface, at least the movable core means being shaped so that the section is formed with rib means in the vicinity of the interface, the rib means being adapted to project towards the reels to limit the axial movement thereof.

BRIEF DESCRIPTION OF THE DRAWINGS

A better understanding of the objects, features and advantages of the invention can be gained from a consideration of the following detailed description of the preferred embodiments thereof, in conjunction with the figures of the accompanying drawing, wherein.

DETAILED DESCRIPTION OF THE PREFERRED EMBODIMENTS

FIGS. 1 to 5 show a conventional tape cassette of the sort used for a video tape recorder.

Figure 1:
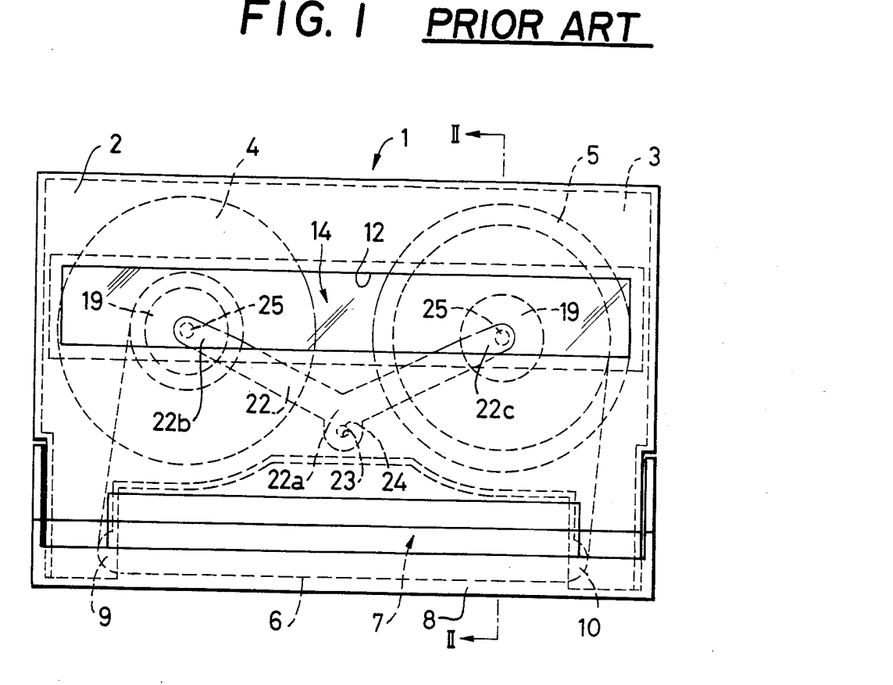
FIG. 1 is a plan view of a conventional tape cassette for a video tape recorder.
Figure 2:
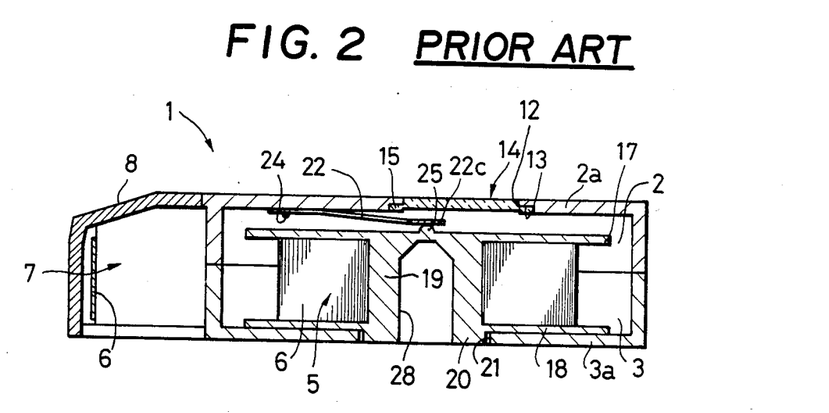
FIG. 2 is a sectional view taken along the line II—II of FIG. 1 and looking in the direction of the arrows.

As FIGS. 1 and 2 show, a cassette housing 1 comprises an upper section 2 and a lower section 3, which are molded of synthetic resin and secured together by suitable conventional means such as screws (not shown). A pair of tape reels 4 and 5 are mounted rotatably in the cassette housing 1, and a magnetic tape 6 is wound on the reels 4 and 5 for transport therebetween. A front lid 8 is pivotably mounted so as selectively to open or close a front opening 7 of the cassette housing 1, and the magnetic tape 6 is guided by a pair of tape guides 9, 10 along the front opening 7 adjacent to the front lid 8.

A window aperture 12 of substantially rectangular configuration is formed substantially centrally in the longitudinal (front to back) direction of the top wall 2a of the upper section 2 and extends substantially over the entire width in the traverse (side-to-side) direction of the wall 2a. A step 13 is formed on the lower periphery of the window aperture 12, and a transparent window plate 14 is mounted in the window aperture 12 and formed integrally with the upper section 2.

Figure 3A:
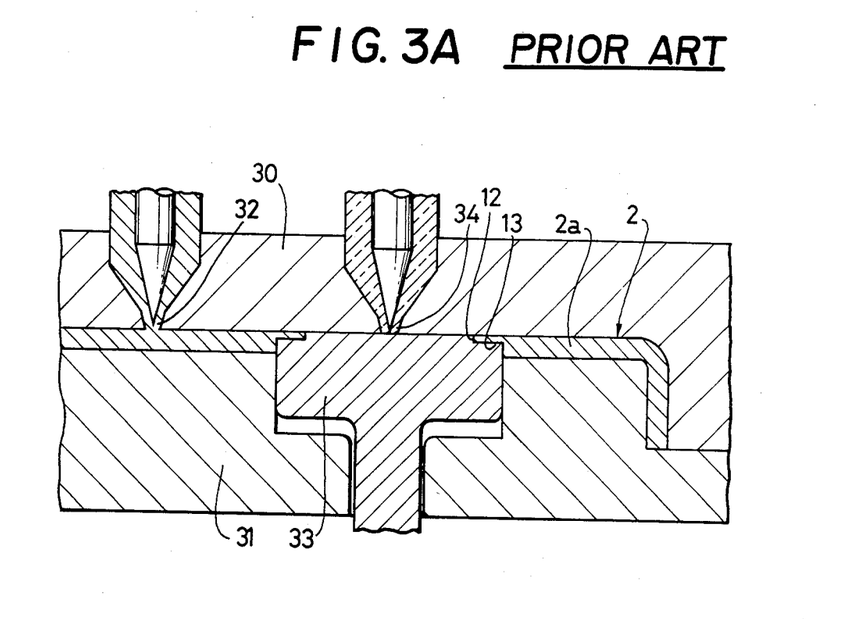
FIGS. 3A and 3B are enlarged, vertically-sectioned, fragmentary views of conventional upper, lower, and slide mold cores for molding an upper section of the cassette housing of FIG. 1.
Figure 3B:
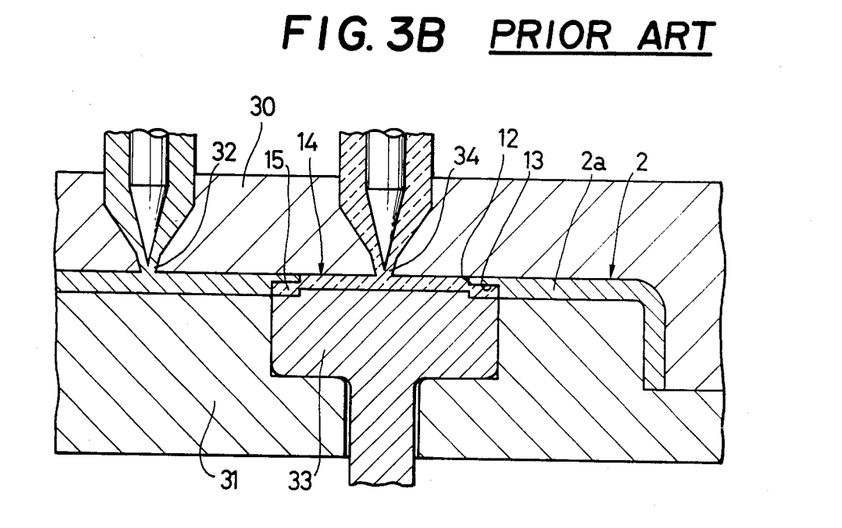

As FIGS. 3A and 3B show, the transparent window plate 14 is molded integrally with the upper section 2 within a mold cavity having stationary core means and movable core means. The stationary core means includes upper and lower mold cores 30 and 31, and the movable core means includes a movable (slidable) core 33. The molding is effected by injection of synthetic resin. As FIG. 3A shows, an opaque resin, for example a black resin, is first injected through an injection gate 32 of the upper mold core 30. The movable or slide mold core 33 is shown in an advanced or elevated position in FIG. 3A wherein it blocks out or occupies a portion of the mold cavity, so that the window aperture 12 is formed in the upper section 2. Since the top of the slide mold core 33 has a step on its periphery, a step 13 is formed on the lower periphery of the window aperture 12.

After the upper section 2 is formed, the movable or slide mold core 33 is slid down within the lower stationary mold core 31 to a retracted position as illustrated in FIG. 3B. A transparent resin is then injected through a second injection gate 34 into the window aperture 12 which is vacated by the slide mold core 33 upon its descent. The transparent resin is at an elevated temperature and fills the window aperture 12 to form a transparent window plate 14 therein having an interface with the opaque portion of the upper section 2. The elevated temperature is such that the black resin on the periphery of the window aperture 12 is partly melted. When both resins set, the transparent window plate 14 is formed integrally with the opaque portion of the upper section 2. The shape of the transparent window plate 14 is derived from the top of the slide mold core 33, so that a flange 15 on the lower periphery of the transparent window plate 14 extends along the step 13. After the transparent window plate 14 is formed integrally with the upper section 2 and an assembly of the tape cassette is completed, the inside of the cassette housing 1 can be seen through the transparent window plate 14 and the amounts of the tape wound on each reel can be visually confirmed.

Each of the tape reels 4, 5 has an upper flange 17 and a lower flange 18 (FIG. 2). A reel hub edge 20, which is the bottom of a reel hub 19, is rotatably fitted in a separate hub-receiving aperture 21 formed in the bottom wall 3a of the lower section 3.

Within the cassette housing 1, a leaf spring 22 is held in a space which is formed between the top wall 2a of the upper section 2 and upper flanges 17 of the tape reels 4, 5. The leaf spring 22 is a V-shaped plate (FIG. 1) having an apex or central portion 22a fixed to the upper section 2. That is, a small bore 23 is provided in the central portion 22a of the leaf spring 22, and a pin 24 formed integrally with the upper section 2 at the inside of its upper wall 2a is received into the bore 23. The tip of the pin 24 is melted and spread out in order to fix the leaf spring 22 to the upper section 2. Both end portions 22b, 22c of the leaf spring 22 push down on respective projections 25 formed integrally with the reel hubs 19 at their upper central portions so as to press the tape reels 4, 5 against the bottom wall 3a of the lower section 3. Thus the reel hub edge 20 of each tape reel 4, 5 is fitted in the associated hub-receiving aperture 21, and the lower flange 18 of each tape reel is normally in contact with the inside of the bottom wall 3a of the lower section 3.

Figure 4:
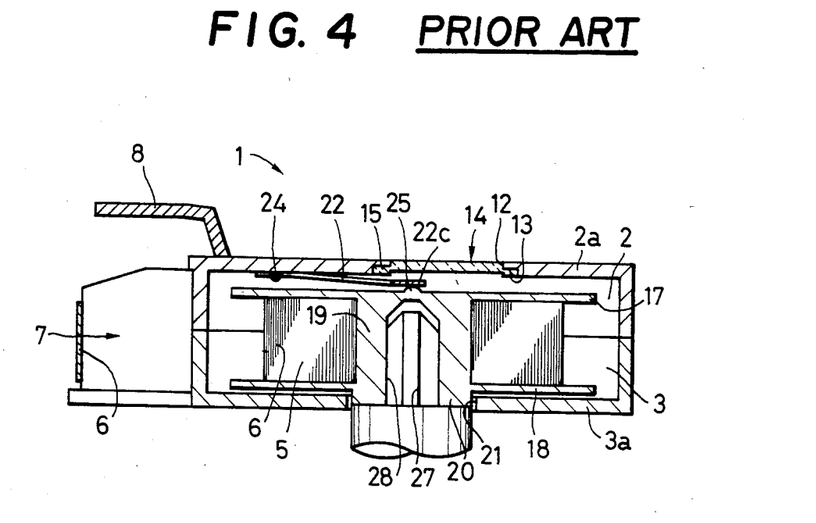
FIG. 4 is a sectional view similar to FIG. 2 of the conventional tape cassette in use.

When the tape cassette is properly inserted into a video tape recorder (not illustrated), the front lid 8 is opened as shown in FIG. 4, and reel drive shafts 27 provided in the video tape recorder are inserted into shaft-receiving apertures 28 of the reel hubs 19, respectively. Each tape reel 4, 5 is then lifted by the corresponding reel drive shaft 27 against the leaf spring 22, so that the lower flange 18 of the tape reel is spaced apart from the bottom wall 3a of the lower section 3. This is necessary in order to make the reels 4, 5 easily rotatable.

Figure 5:
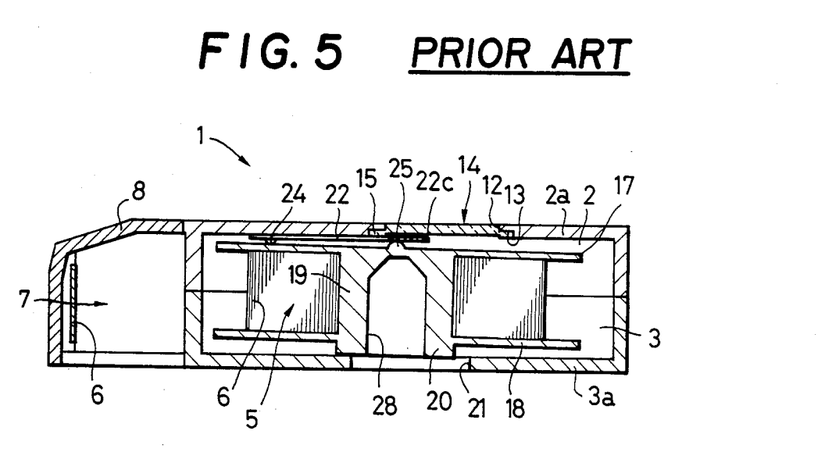
FIG. 5 is a sectional view similar to FIG. 2 of the conventional tape cassette showing the reel misalignment to which the tape cassette is susceptible.

The conventional tape cassette as described above has a number of defects:

When the tape cassette is handled, a finger or thumb may press against the exposed reel hub edge 20 of the reel hub 19, so that either tape reel 4 or 5 is apt to be pushed upward against the force of the leaf spring 22. If the force pushing up the tape reel 4 or 5 is sufficient, the edge 20 of the corresponding reel hub 19 is not retained in the hub-receiving aperture 21, but comes out of the hub-receiving aperture 21. As FIG. 5 shows, the edge 20 of the reel hub 19 then may mount the bottom wall 3a of the lower section 3 and be held in a cocked position by the strong bias of the leaf spring 22. If the tape cassette is inserted in a video tape recorder in this condition, the reel drive shaft 27 can not be inserted into the aperture 28 of the reel hub 19, and the tape reel 4, 5 is not only not able to be rotated but also apt to be damaged, because the drive shaft 27 presses against the misaligned edge 20 of the reel hub 19.

Figure 6A:
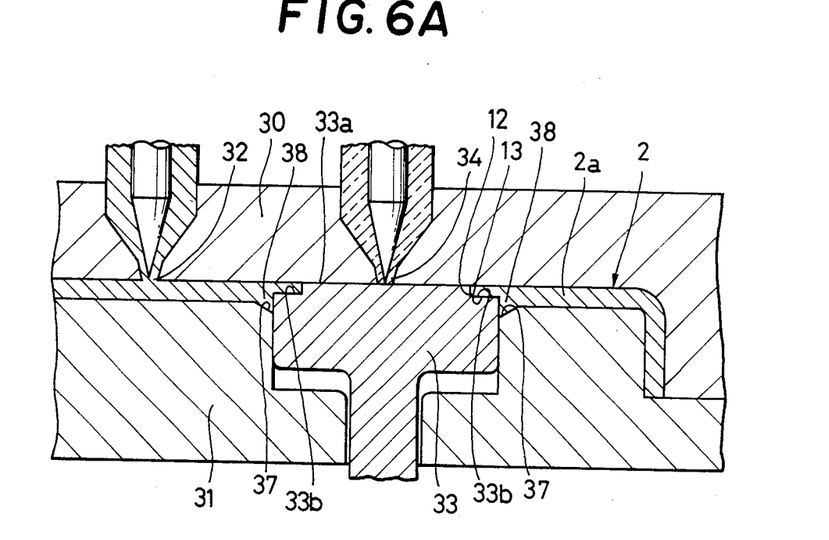
FIGS. 6A and 6B are enlarged, vertically-sectioned, fragmentary views of upper, lower, and slide mold cores for molding an upper section of a cassette housing of a tape cassette according to a first embodiment of the invention.
Figure 6B:
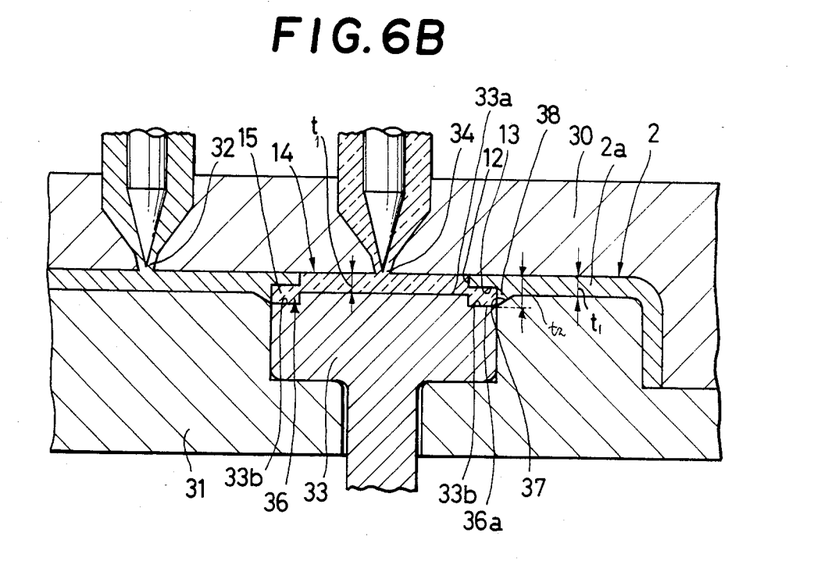

FIGS. 6A and 6B show a method of manufacturing, and FIGS. 7 to 10 show preferred embodiments of, a tape cassette constructed in accordance with the invention. To the extent that the reference characters employed in FIGS. 6A to 10 are the same as those employed in FIGS. 1 to 5, the same parts are identified and need not be further described.

Figure 7:
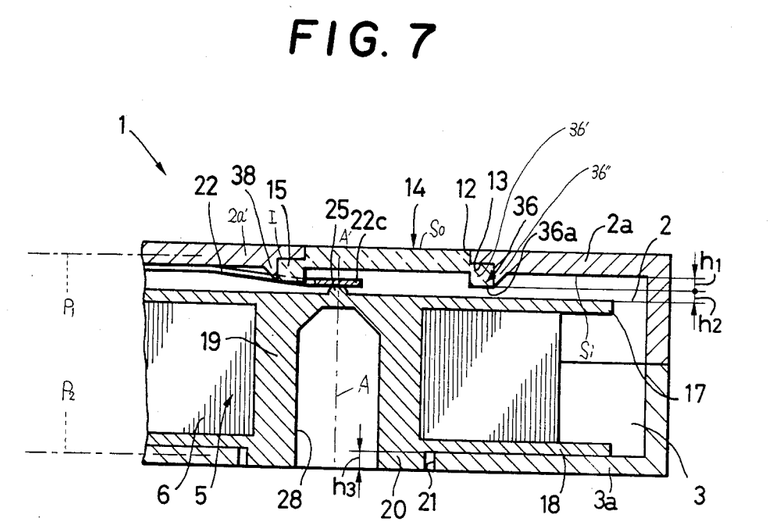
FIG. 7 is an enlarged, vertically-sectioned, fragmentary view of the tape cassette according to the first embodiment of the invention.

In accordance with the invention, a rib 36 shown in FIG. 7 is formed on the top wall 2a of the upper section 2 and projects therefrom towards the tape reels 4 and 5. The rib 36 is preferably formed at least in part (as indicated at 36') on the lower periphery of a flange 15 of a transparent window plate 14 at a time when the transparent window plate 14 is molded. The rib 36 is also formed at least in part (as indicated at 36") on the opaque portion 2a' of the top wall 2a. The rib 36 is at least in part closely spaced apart from an extension A' of the axis A of each tape reel 4 or 5. The top and bottom walls 2a and 3a lie substantially in parallel, spaced-apart planes $P_1$ and $P_2$, respectively, and the axis A of each tape reel 4 or 5 extends in a direction substantially normal to the planes $P_1$ and $P_2$. The rib 36 projects downward from the inside of the upper wall 2a of the upper section 2. The transparent window plate 14 is molded integrally with the upper section 2 in an upper stationary mold core 30 (FIGS. 6A and 6B), a lower stationary mold core 31 and a slide mold core 33. The slide mold core 33 has a step 33b on the periphery of its top 33a. Molding is effected by the injection of synthetic resin as in the case of the conventional tape cassette. As FIGS. 6A and 6B show, a tapered portion 37 is provided on the upper edge of the lower stationary mold core 31 facing the movable or slide mold core 33. A line portion or border 38 of a substantially triangular cross section is thus formed integrally with the upper section 2 on an interior portion of its upper wall 2a. The border 38 forms the portion 36" of the rib 36.

As FIG. 6B shows, the movable or slide mold core 33 is thereafter moved down within the lower mold core 31 by a distance substantially equal to the thickness $t_1$ of the upper wall 2a of the upper section 2. Because of the step 33b of the slide mold core 33, when the transparent window plate 14 is formed in the window aperture 12 integrally with the upper section 2, the rib 36, and more particularly the portion 36' thereof, is formed on the lower periphery of the flange 15 of the transparent window plate 14. The outer periphery of the portion 36' of the rib 36 is connected with the border 38 to form an integral structure.

Figure 8:
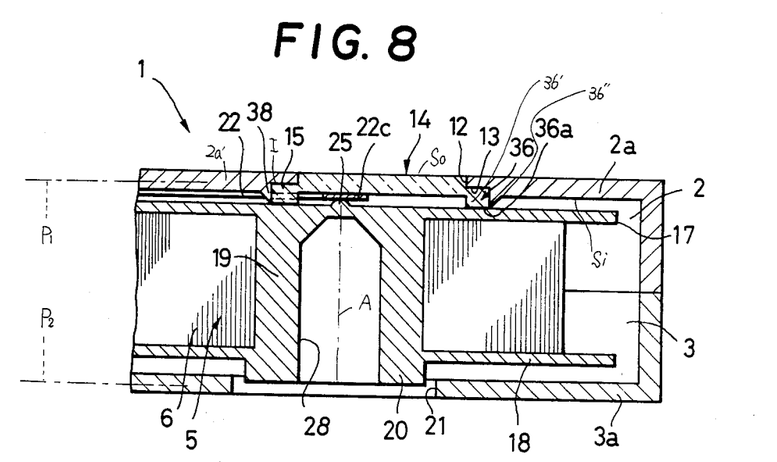
FIG. 8 is a view similar to FIG. 7 showing the limited upward movement of a tape reel mounted within the cassette, thereby preventing misalignment of the tape reel.

The window plate 14 and opaque portion 2a' (FIGS. 7 and 8) of the upper section 2 meet at an interface I, best shown in FIGS. 7, 8, 9A, 9B and 10, which extends through the cassette housing from the inside $S_i$ to the outside $S_o$ thereof (FIGS. 7 and 8). The shortest distance measured along the interface I from the inside $S_i$ to the outside $S_o$ of the cassette housing exceeds the maximum thickness $t_2$ of the housing in the vicinity of the interface I (FIG. 6B).

As mentioned above, the transparent window plate 14 is formed integrally with the upper section 2, and the upper section 2 constitutes a part of the tape cassette as shown in FIG. 7, when the tape cassette is assembled. The projection height $h_1$ of the rib 36 with respect to the lower surface of the top wall 2a is selected so that the distance $h_2$ from the lower end 36a of the rib 36 to the upper flange 17 of the tape reel 4 or 5 is less than the distance $h_3$ from the bottom of the reel hub 19 to the top surface of the bottom wall 3a. Portions of the rib 36 including the border 38 which intersect with the leaf spring 22 are removed in order to accommodate the spring 22.

The extent to which the tape reels 4 and 5 mounted within the tape cassette of the invention can be lifted is limited by the rib 36. In particular, each of the tape reels 4 and 5 is movable axially between a lower position limited by engagement with the bottom wall 3a and an upper position limited by engagement with the rib 36, the rib 36 being spaced apart from the bottom wall 3a a distance sufficient to enable axial movement by each of the tape reels 4 and 5 away from the bottom wall 3a in order to facilitate rotation of the tape reels 4 and 5 but insufficient to enable withdrawal of the hubs 19 from the hub-receiving apertures 21.

That is, FIG. 8 shows, when the lower end of the reel hub 19 of the tape reel 4 or 5 is lifted up, the upper flange 17 abuts the lower end 36a of the rib 36. The tape reel 4 or 5 is thus restricted in its upward movement, and the edge 20 of the reel hub 19 is retained in the hub-receiving aperture 21, because the distance $h_2$ of the upward movement of the tape reel 4 or 5 is less than the height $h_3$ of the edge portion 20 of the reel hub 19. Therefore, the edge portion 20 of the reel hub 19 does not come out of the hub-receiving aperture 21 and also is prevented from mounting the inside of the bottom wall 3a of the lower section 3, so that the tape reel 4 is 5 is always maintained in a correct position within the cassette housing 1.

In addition, the rib 36 not only reinforces the transparent window plate 14 but also improves the rigidity of the upper section 2, so that the upper section 2 is prevented from warping.

In this embodiment, the strength of the joint between the transparent window plate 14 and the upper section 2 is improved, because the portion 36' of the rib 36 is fused to the portion 36" in such a manner that the area of the joint between the transparent window plate 14 and the opaque portion 2a' of the upper section 2 is increased. Further, because of the tapered portion 37 (FIGS. 6A and 6B) of the lower mold core 31, by which the border 38 is formed, the slide mold core 33 can be moved smoothly downward, and the abrasion between the slide mold core 33 and lower mold core 31 is reduced, so that the useful lives of the slide mold core 33 and lower mold core 31 are prolonged. In addition, the tapered portion 37 of the lower mold core 31 prevents the upper section 2 from sticking to the lower mold core 31 and improves the separation of the upper section 2 from the lower mold core 31.

Figure 9A:
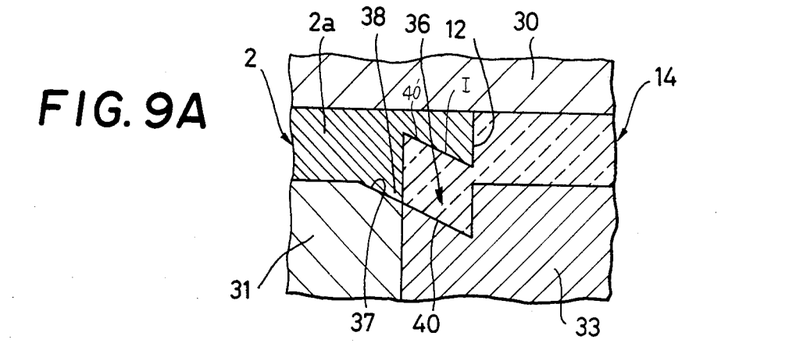
FIGS. 9A and 9B are enlarged, vertically-sectioned, fragmentary views of the upper, lower and slide mold cores for manufacturing a tape cassette according to respective variants of the first embodiment of the invention.
Figure 9B:
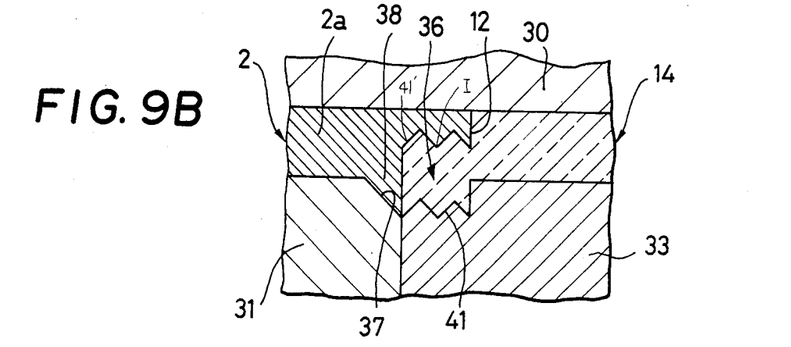

The shape of the rib 36 is not limited to that shown in the embodiment described above, and various modifications thereof may be made. For example, two modified shapes of the rib 36 are shown in FIGS. 9A and 9B. In FIG. 9A, the window plate 14 in the vicinity of the rib 36 has lower and upper faces 40 and 40', respectively, which are inclined inwardly and downwardly. In FIG. 9B, the window plate 14 in the vicinity of the rib 36 has lower and upper faces 41 and 41', respectively, which are serrated. When the shape of the rib 36 is modified as mentioned above, the area of the joint section between the transparent window plate 14 and the opaque portion of the upper section 2 is further increased, and the joint strength is improved markedly.

Figure 10:
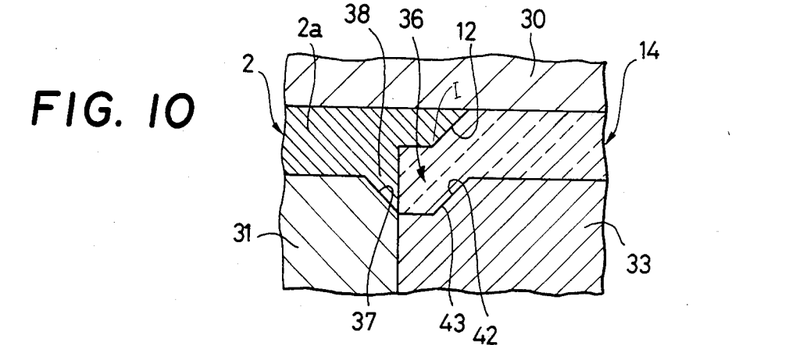
FIG. 10 is an enlarged, vertically-sectioned, fragmentary view of the upper, lower and slide mold cores for manufacturing a tape cassette according to a second embodiment of the invention.

FIG. 10 shows an embodiment wherein a tapered rib 43 is obtained owing to a tapered portion 42 provided on the outer side of the top of the slide mold core 33. Thus, the upper section 2, including the transparent window plate 14, can be easily separated from the lower stationary mold core 31 and movable or slide mold 33. That is, the rib 36 is intimately associated with the interface I where the window plate 14 is joined to the opaque portion of the top wall 2a of the upper section 2, and projects downward from the inside of the top wall 2a of the upper section 2. When it sets, resin typically shrinks and is apt to adhere to the mold core within which it is contained. It thus might be difficult to separate the rib 36 from the slide mold core 33. However, in case of this embodiment, adhesion to the slide mold core 33 is avoided because of the tapered rib 43. The upper section 2 including the window plate 14 can thus be separated easily from the lower mold core 31 and slide mold core 33.

The invention is applicable to tape cassettes not only for video tape recorders but also for recording and/or reproducing apparatus of other kinds, and for information processing apparatus of one sort or another.

A indicated above, the rib formed at least in part on the lower periphery of a transparent window plate at a time when the transparent window plate is molded projects downward from the inside of the upper cassette section. When elevated, the tape reels abut the lower part of the rib and are restricted in their upward movements.

According to this invention, the tape reels are prevented from coming out of the reel positioning holes and mounting the bottom wall of the lower section of the cassette. Therefore, the tape reels are always maintained in a correct position within the cassette housing.

Further, the rib is preferably formed integrally with the lower periphery of the transparent window plate, and the tape reels are prevented from coming out of the reel positioning holes, even when the tape reels are lifted up forcibly. In addition, the rib acts as a reinforcement of the transparent window plate and opaque portion of the upper section, and improves their mechanical strength.

Furthermore, as the rib is preferably molded at least in part at the time when the transparent window plate is formed integrally with the opaque portion of the upper section, the upper section with the rib can be made easily as a single integrated structure. Hence, the transparent window plate does not become detached from the upper section.

Many other embodiments of the invention will readily occur to these skilled in the art upon consideration of this disclosure. Accordingly, the invention includes all structures and methods which are within the scope of the appended claims.

What is claimed is:

1. A tape cassette comprising:
   a cassette housing including an upper section and a lower section, said upper section having a top wall including an opaque portion and a transparent window plate and said lower section having a bottom wall formed with a pair of hub-receiving apertures therein, said top and bottom walls lying substantially in parallel, spaced-apart planes;
   a pair of tape reels mounted within said housing, each of said tape reels being formed with a hub and having an axis extending in a direction substantially normal to said planes, and each having an axial projection, said axial projections of said hubs being respectively rotatably received within said hub-receiving apertures;
   resilient means for biasing said axial projections of said hubs into said apertures; and
   rib means formed on said top wall and projecting therefrom towards said tape reels, each of said tape reels being movable axially between a lower position limited by engagement with said bottom wall and an upper position limited by engagement with said rib means, said rib means being spaced apart from said bottom wall a distance sufficient to enable axial movement by each of said tape reels away from said bottom wall in order to facilitate rotation of said tape reels but insufficient to enable withdrawal of said projections of said hubs from said respective hub-receiving apertures.

2. A tape cassette according to claim 1; wherein said rib means is formed at least in part on the lower periphery of said window.

3. A tape cassette according to claim 1; wherein said rib means is formed at least in part on said opaque portion.

4. A tape cassette according to claim 1; wherein said rib means is at least in part closely spaced apart from extensions of each of said axes.

5. A tape cassette according to claim 1; wherein said rib means and said window plate are formed at least in part of the same material and are integral with each other.

6. A tape cassette according to claim 5; wherein said material is a transparent resin.

7. A tape cassette according to claim 1; wherein said window plate and said opaque portion are integral with each other.

8. A tape cassette according to claim 7; wherein said window plate is formed of a transparent resin and said opaque portion is formed of an opaque resin.

9. A tape cassette according to claim 7; wherein said window plate and said opaque portion meet at an interface, said interface extending through said housing from the inside to the outside thereof, the distance measured along said interface from the inside to the outside of said housing exceeding the maximum thickness of said housing in the vicinity of said interface.

* * * * *